(12) United States Patent
Savoia

(10) Patent No.: US 10,130,070 B2
(45) Date of Patent: Nov. 20, 2018

(54) WASHING MACHINE WITH A LOW NUMBER OF NOZZLES

(71) Applicant: IWT S.R.L., Casale Litta (IT)

(72) Inventor: Luciano Savoia, Saronno (IT)

(73) Assignee: IWT S.R.L., Casale Litta (IT)

( * ) Notice: Subject to any disclaimer, the term of this patent is extended or adjusted under 35 U.S.C. 154(b) by 224 days.

(21) Appl. No.: 14/662,370

(22) Filed: Mar. 19, 2015

(65) Prior Publication Data

US 2015/0266065 A1 Sep. 24, 2015

(30) Foreign Application Priority Data

Mar. 19, 2014 (IT) .............................. MI2014A0459

(51) Int. Cl.
*A01K 1/03* (2006.01)
*A47L 15/20* (2006.01)
*B08B 3/02* (2006.01)

(52) U.S. Cl.
CPC .............. *A01K 1/031* (2013.01); *A47L 15/20* (2013.01); *B08B 3/024* (2013.01)

(58) Field of Classification Search
CPC .......... A01K 1/031; B08B 3/02; B08B 3/024; A47L 15/20; B60S 3/04
See application file for complete search history.

(56) References Cited

U.S. PATENT DOCUMENTS

| 3,773,266 A | * | 11/1973 | Raefield | .............. B05B 13/0405 |
| | | | | 239/243 |
| 3,884,263 A | * | 5/1975 | Wright | ................ A47L 15/0071 |
| | | | | 134/58 D |
| 4,679,578 A | * | 7/1987 | Miller | ...................... B60S 3/04 |
| | | | | 134/123 |
| 5,197,673 A | | 3/1993 | William | |
| 5,255,695 A | * | 10/1993 | Downey | ................... B60S 3/04 |
| | | | | 134/123 |
| 2014/0311535 A1 | * | 10/2014 | Zardini | ..................... A61L 2/26 |
| | | | | 134/200 |
| 2015/0007861 A1 | * | 1/2015 | Azmi | ..................... A47L 15/20 |
| | | | | 134/172 |

FOREIGN PATENT DOCUMENTS

| EP | 0567208 A2 | 10/1993 |
| EP | 1486158 A1 | 12/2004 |
| EP | 2366465 A1 | 9/2011 |

* cited by examiner

*Primary Examiner* — Spencer E Bell
(74) *Attorney, Agent, or Firm* — LeClairRyan PLLC

(57) ABSTRACT

A washing machine (1) for washing animal cages and/or other equipment or accessories used in animal facilities and/or in research laboratories, comprising a washing chamber (2); a plurality of rods (3) arranged inside the washing chamber (2) and designed for spraying a fluid on a load to be washed, each rod (3) comprising a plurality of nozzles (4) for the inlet of said fluid in said washing chamber (2); pumping means associated with the rods (3) to feed the fluid to the nozzles (4); the machine 1 comprises a maximum of six of such rods (3).

8 Claims, 3 Drawing Sheets

WASHING MACHINE WITH A LOW NUMBER OF NOZZLES

This application claims the benefit of Italian Patent Application Serial No. MI2014A000459 filed Mar. 19, 2014, which is hereby incorporated by reference in its entirety.

FIELD

The present invention relates to a washing machine for washing animal cages and/or other equipment or accessories used in animal facilities and/or in scientific research laboratories.

BACKGROUND

Washing machines have been developed that can wash racks and/or trolleys supporting a plurality of objects. These machines are known in the sector as rack washers, but as mentioned they are washing machines which have reached very high levels of sophistication because they must wash animal cages used in animal facilities in research centers for containing laboratory animals.

A washing machine known in the prior art comprises a washing chamber, usually having a volume of approximately 6-8 cubic meters. Such a chamber is provided to house laboratory equipment, hereinafter named "load" (e.g. a trolley on which the objects and the other accessories to be washed are positioned).

The machine further comprises one or more tanks for preparing the washing water. Such tanks are connected to the washing chamber provided with centrifuge pumps for hydraulic movement. A bath collection vessel is placed under the floor of the chamber to collect the water exiting from the chamber itself.

More in detail, the machine comprises a plurality of rods placed within the washing chamber. Such rods each comprise a plurality of nozzles capable of spraying water onto the load to wash it. In use, the washing bath is aspirated from the tank mentioned above and is thus sent to the rods. The water falls into the vessel after having struck the load. At this point, the bath can be extracted from the vessel and returned to the washing tank. In order to spray the bath on all the exposed surfaces of the load, the rods are rotated about their axes by a given angle with a reciprocating motion with respect to the rest position during the washing cycle.

In the prior art, the machines comprise eight rods described above, arranged on two longitudinal sides of the machine, four on each side. Disadvantageously, the loss of fluid-dynamic loads related to the presence of the rods causes a considerable energy consumption and requires oversizing the pump, which both cause high running costs related to the considerably energy consumption in turn.

SUMMARY

In this context, the technical task underlying the present invention is to suggest a washing machine for laboratory equipment which overcomes the drawbacks of the prior art mentioned above.

In particular, the machine according to the present invention can wash racks and/or trolleys supporting a plurality of objects.

In particular, it is the object of the present invention to make available a washing machine for laboratory equipment capable of reducing energy consumption.

It is a further object of the present invention to suggest a washing machine for laboratory equipment having higher efficiency.

It is a further object of the present invention to suggest a washing machine for laboratory equipment capable of reducing running costs.

The technical task and the specified objects are substantially reached by a washing machine for laboratory equipment comprising the technical features illustrated in one or more of the appended claims.

In particular, the reduction of the number of rods (from eight to six) causes a reduction of the fluid-dynamic losses in the feeding circuit.

Furthermore, the reduction of the number of rods, combined with the conservation of fluid feeding devices (the pumps) themselves in use in the prior art, allows to maintain the same overall flow rate used in the eight rod machines, and consequently, a higher flow rate for each single sprayer nozzle.

The flow rate/pressure hydraulic feature of the centrifuge pump used to move the washing water allows for maintaining the pressure, and thus the speed of the liquid at the outlet of the various nozzles, nearly constant with a considerable increase of the flow rate of the single nozzles, because their number is low.

A jet of fluid at higher flow rate, considering a practically equal outlet speed of the jet of fluid, implies a greater cleaning efficacy, and thus allows to make shorter washing cycles with a considerable reduction of consumption and of running costs.

The overall efficiency of the washing machine is improved as a consequence.

BRIEF DESCRIPTION OF THE DRAWINGS

Further features and advantages of the present invention will be more apparent in the following indicative and consequently non-limitative description of a preferred, but not exclusive, embodiment example of a washing machine for laboratory equipment as shown in the accompanying drawings, in which.

DETAILED DESCRIPTION

Figure 1:
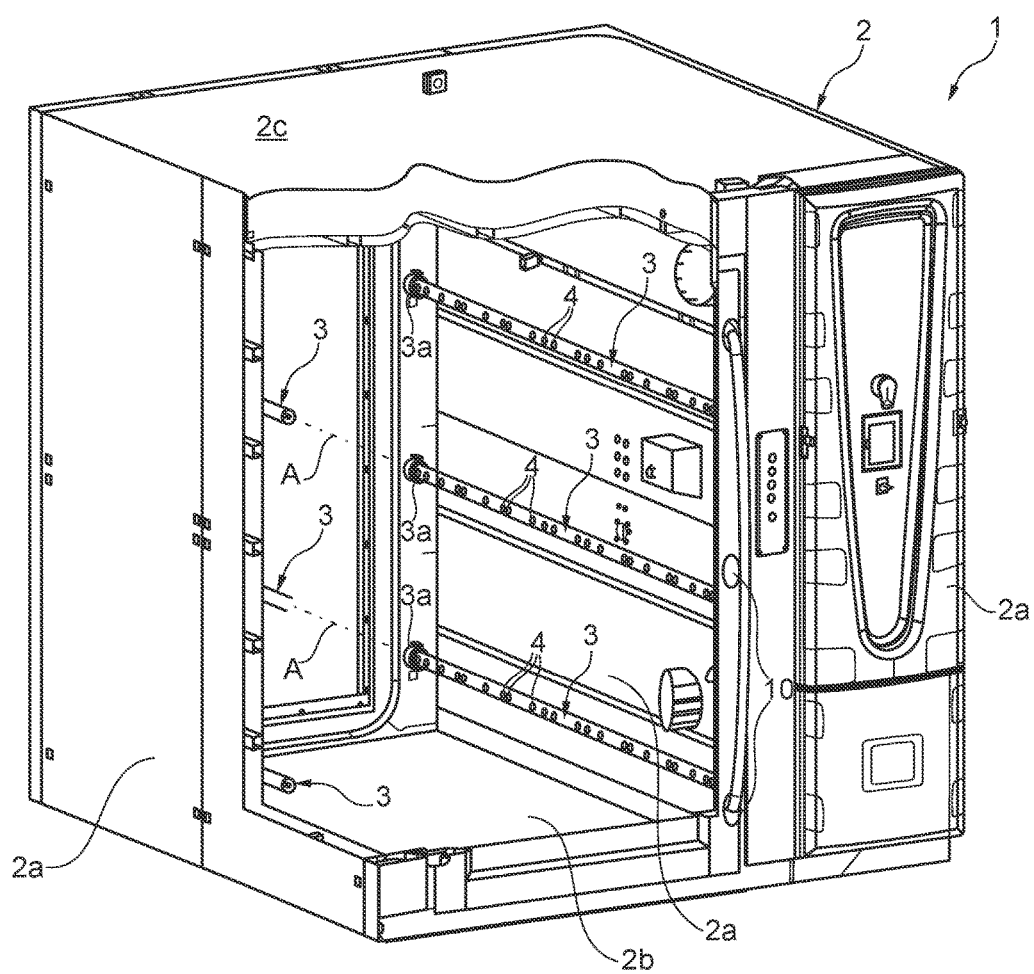
FIG. 1 is a perspective view of a washing machine according to the present invention with some parts removed to show others better.
Figure 2:
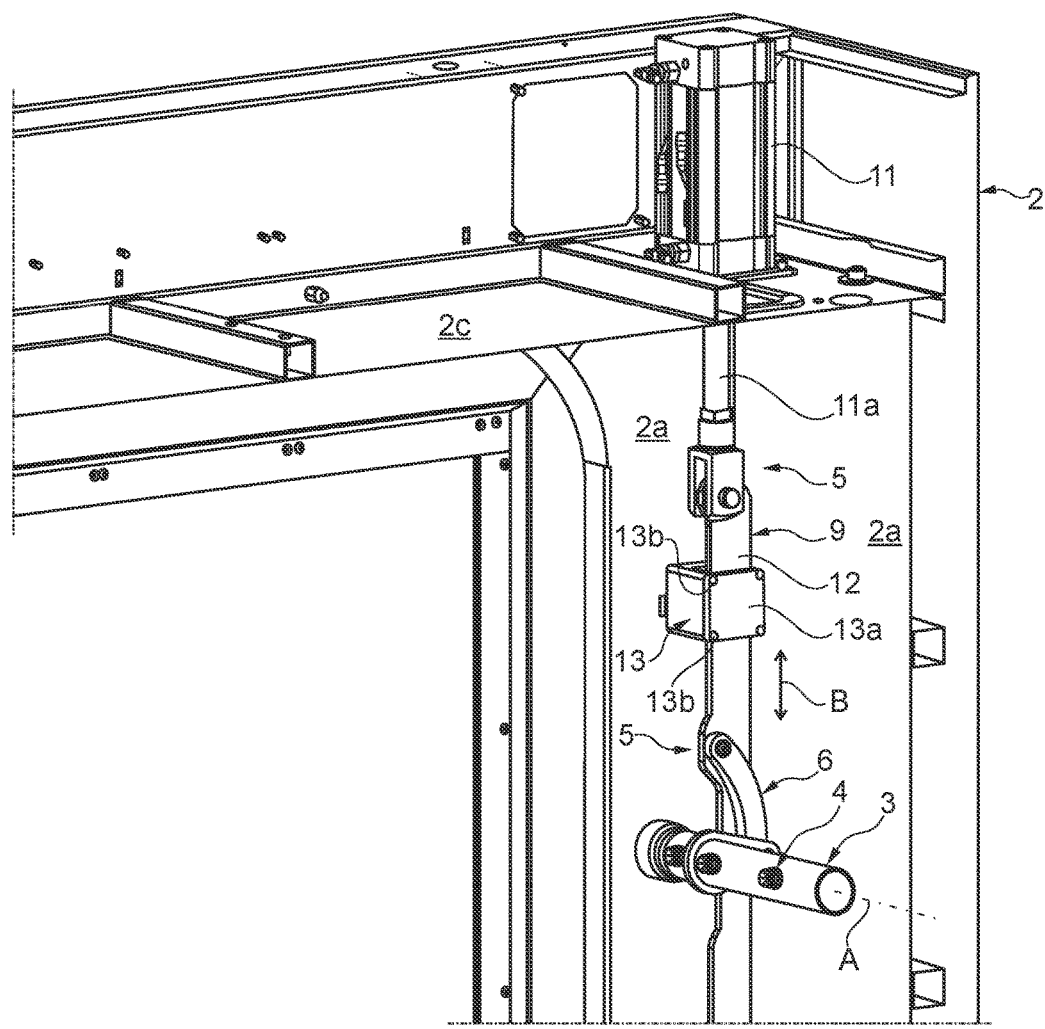
FIGS. 2 and 3 are perspective views of respective parts of the machine in FIG. 1.
Figure 3:
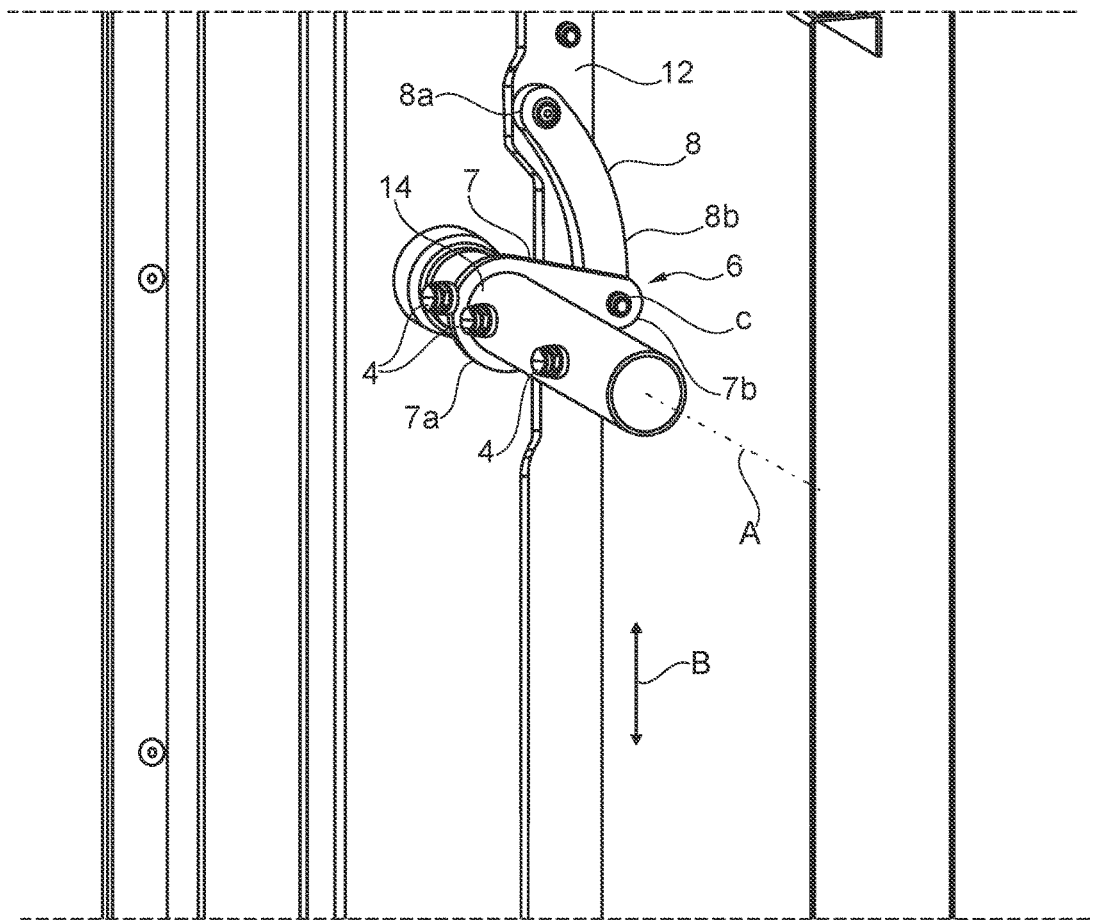

With reference to FIGS. 1-3, reference numeral 1 indicates a washing machine for washing laboratory equipment or accessories according to the present invention. The machine 1 comprises a washing chamber 2. As shown in particular in FIG. 1, the washing chamber 2 defines an internal volume adapted to house the load to be washed, such a volume is approximately 6-8 cubic meters.

More in detail, the chamber 2 defines a quadrangular internal volume and is defined by four side walls 2a, a floor 2b and a roof 2c opposite to the floor 2b. The chamber 2 is provided to house the racks supporting the load to be washed (not shown), hereinafter named "load". Such a load, during the operation of the machine 1, is firstly sprayed with a washing fluid and, during a later step, with a rinsing fluid. The washing and rinsing fluids are known in themselves, and therefore will not be described further in the present description.

A collecting vessel (not shown) is placed under the floor 2b of the chamber 2, so as to collect the fluids let out from the chamber itself which fall onto the floor. Openings (not shown) in the floor 2b allow the mentioned fluids to go from the chamber 2 to the vessel.

The machine 1 further comprises one or more tanks for preparing the washing water (not shown). Such tanks are connected to the washing chamber 2 by pipes (also not shown) provided with centrifuge pumps for hydraulic movement.

More in detail, the machine 1 comprises a plurality of rods 3 placed within the washing chamber 2. In particular, the rods 3 are configured for spraying washing fluid and/or rinsing fluid on the load. Such rods 3 each comprise a plurality of nozzles 4 capable of spraying water onto the load to wash it.

The function of the nozzles 4 is to let washing fluid and/or rinsing fluid into the chamber 2. Preferably, the function of some nozzles 4 is to spray the washing fluid into the chamber 2 directly onto the load, while the function of others is to spray the rinsing fluid. According to one embodiment of the present invention, each rod 3 comprises at least fourteen washing nozzles 4.

In detail, again in the machine configuration illustrated here by way of non-limitative example of the present invention, the washing nozzles 4 expel the fluid at least at a pressure of 2.5 bar. In one embodiment, such nozzles 4 are of the flat jet cone jet type with opening angle of at least 60°.

Advantageously, providing a fewer washing nozzles 4 in total with an oversized nozzle with respect to the prior art improves the TTI (Theoretical Total Impact, which is an index of washing efficiency of the machine 1) by nearly 50%.

To provide some numeric data, the fluid flow rate for each nozzle 4 on the machine according to the present invention is equal to 17.85 l/min, the pump specifications being equal with respect to a machine with eight rods of the type known in the prior art, which had a flow rate of 11.7 l/min for each nozzle.

It is apparent that a higher flow rate ultimately translates into a higher force impact of the fluid on the load to be washed.

As shown, for example in FIG. 1, the machine 1 comprises six rods 3 of the type described above. Such rods 3 are preferably arranged on two of the side walls 2a opposite to each other. In other words, the machine 1 comprises two arrays 10 of rods 3. Each array 10 comprises three respective rods 3, each array 10 being placed on a respective side wall 2a of the chamber 2.

It is worth noting that the rods 3 are arranged horizontally and parallel to each other in the embodiment shown in the accompanying figures. In an alternative embodiment (not shown), the rods 3 can be arranged vertically, again parallel to each other.

Pumping means (not shown) are associated with the rods 3 so as to feed the fluids to the nozzles 4. By way of example, such pumping means may comprise a 5.5 kW centrifuge pump. The pumping means will not be described further because they are known in themselves to a person skilled in art.

With reference in particular to FIG. 1, each rod 3 has a major development axis "A". Furthermore, each rod 3 can rotate about the major development axis "A" to vary the direction of the jet at the outlet of the nozzle 4, so as to strike all of the load. In particular, the rod 3 has an end pair 3a, arranged along the major development axis "A" and opposite to each other. Each rod 3 is thus hinged to the chamber 2 at the two ends 3a thereof and rotatable about axis "A" by an arc having width comprised between 100° and 180°, preferably equal to 120°. This rotation arc allows an optimal spraying of the load with three rods.

In order to obtain such a rotation, the machine 1 further comprises moving means 5 of the rods 3 preferably configured to rotate each of the rods 3 about the respective major development axis "A".

In detail and with reference to FIGS. 2 and 3, the moving means 5 comprise a linear actuator 9, moveable along an operating direction "B". Such a linear actuator 9 is preferably transversal and even more preferably perpendicular to the rods 3. Consequently, in the embodiment shown in the accompanying figures, the operating direction "B" is substantially perpendicular to the floor 2b and to the roof 2c of the washing chamber 2. In other alternative embodiments (not shown), the operating direction "B" may be different, e.g. horizontal. With reference in particular to the details in FIGS. 2 and 3, it is worth noting that a linear actuator 9 is present for each array 10 of rods 3.

More in detail, the linear actuator 9 comprises a pneumatic cylinder 11, fixed to the chamber 2, in particular above the roof 2c. The cylinder 11 comprises a stem 11a which crosses the roof 2c of the chamber 2. The movement of the cylinder 11 and, in particular, of the stem 11a defines the mentioned operating direction "B" of the linear actuator 9.

The linear actuator 9 comprises a bar 12, preferably made starting from a stainless steel plate. The bar 12 is connected to the cylinder 11, in particular the stem 11a. In particular, such a bar 12 is arranged along the operating direction "B" of the linear actuator 9. Such a bar 12 is sliding along the operating direction "B" with reciprocating motion. In particular, the bar is fixed to one of the side walls 2a of the chamber 2 by a plurality of guides 13 made of plastic material with a low friction coefficient. Such guides 13 are made with parallelepiped shaped blocks, and are provided with lids 13a fixed by means of four screws 13b to allow the rapid assembly of the bar 12.

The handling means 5 further comprise transmission members 6 operatively associated with the linear actuator 9 and to the rods 3. In particular, respective transmission elements 6 are associated with each linear actuator 9. In further detail, the transmission elements 6 connect the bar 12 to a respective rod 3. In other words, three groups of transmission elements 6, one for each rod 3 actuated by the bar 12, are associated with each bar 12.

In detail, the transmission elements 6 comprise a first arm 7, arranged transversally with respect to the rod 3. Such a first arm 7 has a first 7a and a second end 7b. Such a first arm 7 is, in particular, connected to the rod 3 at the first end 7a, thus defining a hinge "C" at the second end 7b.

More in detail, the first end 7a of the first arm 7 has a hole 14 in which the rod 3 is integrally inserted. In particular, the shape and size of the hole 14 are complementary to a cross section of the rod 3.

The transmission elements 6 further comprise a second arm 8. The second arm 8 also has a first 8a and a second end 8b. Such a second arm 8 is connected to the linear actuator 9 at the first end 8a. More in particular, the second arm 8 is hinged to the bar 12 at the first end 8a. Furthermore, the arm 8 is connected to the hinge "C" at the second end 8b.

In detail, the second arm 8 is a curved lever connecting rod, in particular circumference sector shaped, made of stainless steel, which has the function of transforming the linear movement of the bar 12 into the rotary movement of the rod 3.

In use, the washing fluid is aspirated from the tank mentioned above and is thus sent to the rods 3. Such a fluid is ejected from the nozzles 4 and, after having struck the load, falls into the vessel. The washing fluid may thus be extracted from the vessel and returned to the washing tank.

The moving means 5, and in particular the cylinder 11, are actuated during the operation of the machine 1. Consequently, the rods 3 of each array 10 are moved simultaneously and, in particular, are rotated about the major development axis "A" according to the arc described above.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto

What is claimed is:

1. A washing machine for washing animal cages or other equipment or laboratory accessories comprising:
    a washing chamber having an internal volume of at least six cubic meters;
    two arrays of three rods arranged inside the washing chamber on opposing sidewalls of the washing chamber and positioned to spray a fluid on a load to be washed located in the washing chamber, each of the rods having a respective axis of major extension defining a longitudinal direction around which each of the rods is rotatable, wherein each of the rods comprises:
        a plurality of nozzles for the inlet of the fluid in the washing chamber; and
        a pumping apparatus associated with each of the rods to feed the fluid to the plurality of nozzles; and
    a movement device for each of the two arrays of three rods, the movement device configured to rotate each of the rods about the respective major extension axis, wherein the movement device comprises:
        a linear actuator adapted to be reciprocated along an operating direction perpendicular to the longitudinal direction defined by the respective major extension axis of each of the rods and lying in a plane parallel to the sidewall; and
        a cylinder affixed to the washing chamber and comprising a stem that crosses a wall of the washing chamber perpendicular to the side wall the three rods are disposed on and is connected at one end to a corresponding end of the linear actuator, wherein the stem defines the operating direction of the linear actuator, wherein the movement device further comprises three transmission elements each operatively associated with the linear actuator and a respective rod, wherein each transmission element comprises a first arm, transversally arranged with respect to the respective rod and having a first end and a second end, the first arm being coupled with the respective rod at the first end of the first arm and defining a hinge at the second end of the first arm, and wherein each of the transmission elements further comprises a second arm having a first end and a second end, the second arm being coupled with the linear actuator at the first end of the second arm and with the hinge at the second end of the second arm.

2. The washing machine according to claim 1, wherein each of the rods is rotatable about the major extension axis according to an arc having a width between 100° and 180°.

3. The washing machine according to claim 2, wherein the width of the arc is 120°.

4. The washing machine according to claim 1, wherein each of the three rods in the two arrays of rods are disposed in a horizontal arrangement within the washing chamber with each of the three rods located parallel to each other in the arrays.

5. The washing machine according to claim 1, wherein each of the three rods in the two arrays of rods are disposed in a vertical arrangement within the washing chamber with each of the three rods located parallel to each other in the arrays.

6. The washing machine according to claim 1, wherein the plurality of nozzles are configured to expel the fluid at least at a pressure of 2.5 bar.

7. The washing machine according to claim 1, wherein each nozzle of the plurality of nozzles is of the flat-jet cone type having an opening angle of 60°.

8. The washing machine according to claim 1, wherein each nozzle of the plurality of nozzles has a flow rate of at least 17.85 liters per minute.

\* \* \* \* \*